United States Patent
Idziaszek et al.

(10) Patent No.: US 11,559,044 B2
(45) Date of Patent: Jan. 24, 2023

(54) METHOD OF AND SYSTEM FOR TRACKING AN ANIMAL IN A POPULATION OF ANIMALS

(71) Applicant: Hoffmann-La Roche Inc., Little Falls, NJ (US)

(72) Inventors: Przemek Idziaszek, Warsaw (PL); Antoni Opolski, Warsaw (PL); Jacek Ziemski, Warsaw (PL); Bartosz Binias, Warsaw (PL)

(73) Assignee: HOFFMANN-LA ROCHE INC., Little Falls, NJ (US)

( * ) Notice: Subject to any disclaimer, the term of this patent is extended or adjusted under 35 U.S.C. 154(b) by 0 days.

(21) Appl. No.: 17/050,199

(22) PCT Filed: Apr. 25, 2019

(86) PCT No.: PCT/EP2019/060610
§ 371 (c)(1),
(2) Date: Oct. 23, 2020

(87) PCT Pub. No.: WO2019/207041
PCT Pub. Date: Oct. 31, 2019

(65) Prior Publication Data
US 2021/0105980 A1    Apr. 15, 2021

(30) Foreign Application Priority Data
Apr. 26, 2018 (EP) .................................. 18169420

(51) Int. Cl.
G08B 23/00 (2006.01)
A01K 29/00 (2006.01)
A01K 11/00 (2006.01)

(52) U.S. Cl.
CPC .......... *A01K 29/005* (2013.01); *A01K 11/005* (2013.01)

(58) Field of Classification Search
CPC ............................ A01K 29/005; A01K 11/005
See application file for complete search history.

(56) References Cited

U.S. PATENT DOCUMENTS 9,255,141 B2   2/2016  Wong et al.
9,578,853 B1*  2/2017  Heath ................. A01K 11/005
(Continued)

FOREIGN PATENT DOCUMENTS

CN    102395966 A    3/2012
CN    107209091 A    9/2017
(Continued)

OTHER PUBLICATIONS

Durie et al., Using normal flow for detection and tracking of limbs in color images (Year: 2002).*
(Continued)

*Primary Examiner* — Quang Pham
(74) *Attorney, Agent, or Firm* — Medler Ferro Woodhouse & Mills PLLC

(57) ABSTRACT

A method of tracking an animal in a population of animals is disclosed that includes applying a visual identifier to the animal, associating reference identifier data of the visual identifier to animal data of the animal, capturing a digital image of the visual identifier applied to the animal, recognizing the visual identifier by digitally processing the captured digital image, and identifying the animal upon recognition of the visual identifier.

11 Claims, 2 Drawing Sheets

(56) References Cited

U.S. PATENT DOCUMENTS

| | | | |
|---|---|---|---|
| 2002/0076100 A1* | 6/2002 | Luo | G06V 40/10 |
| | | | 382/164 |
| 2002/0159630 A1* | 10/2002 | Buzuloiu | G06T 7/0002 |
| | | | 382/218 |
| 2002/0189550 A1 | 12/2002 | Julien et al. | |
| 2003/0004652 A1* | 1/2003 | Brunner | G16B 40/20 |
| | | | 702/19 |
| 2003/0055362 A1* | 3/2003 | Hampton | A61B 5/1038 |
| | | | 600/595 |
| 2005/0210267 A1* | 9/2005 | Sugano | H04W 12/069 |
| | | | 713/186 |
| 2010/0260426 A1 | 10/2010 | Huang et al. | |
| 2015/0078626 A1* | 3/2015 | Kinard | G06V 40/18 |
| | | | 382/110 |
| 2016/0095292 A1* | 4/2016 | Hosseini | H04N 1/00209 |
| | | | 348/161 |
| 2016/0213750 A1 | 7/2016 | Wong et al. | |
| 2017/0103257 A1* | 4/2017 | Kasin | G06V 40/70 |
| 2017/0328817 A1 | 11/2017 | Barnes et al. | |
| 2018/0018508 A1 | 1/2018 | Tusch | |
| 2018/0027766 A1 | 2/2018 | Doubet | |
| 2019/0325644 A1* | 10/2019 | Bleyer | G06T 17/20 |
| 2020/0143157 A1 | 5/2020 | Borchersen et al. | |

FOREIGN PATENT DOCUMENTS

| | | | | |
|---|---|---|---|---|
| CN | 107430679 A | 12/2017 | | |
| CN | 107820616 A | 3/2018 | | |
| DE | 10 2005 012678 A1 | 9/2006 | | |
| DE | 102005012678 A1 * | 9/2006 | ............. | A01K 11/00 |
| WO | 2017049244 A1 | 3/2017 | | |

OTHER PUBLICATIONS

Luo et al., Human limb motion real-time tracking based on CamShift for intelligent rehabilitation system (Year: 2009).*

Borremans et al., Evaluation of short-, mid-and long-term effects of toe clipping on a wild rodent. (Year: 2015).*

Iwaki et al., identification of newborn rats by tattooing (Year: 1989).*

Paluch et al., Developmental and Behavioral Effects of Toe Clipping on Neonatal and Preweanling Mice with and without Vapocoolant Anesthesia (Year: 2014).*

Chen et al., Tattooing Various Combinations of Ears, Tail, and Toes to Identify Mice Reliably and Permanently (Year: 2016).*

Caorsi et al., Clip or Snap An Evaluation of Toe-Clipping and Photo-Identification Methods for Identifying Individual Southern Red-Bellied Toads *Melanophryniscus cambaraensis* (Year: 2012).*

Journal of Applied Ecology, Gamble—Multi-scale features for identifying individuals in large biological databases (Year: 2007).*

Marcella Kelly, Computer-aided Photograph Matching in Stidies Using Individual Identificaiton An Example From Serengeti Cheetahs (Year: 2001).*

Methods Ecol Evol, Bolger—A computer-assisted system for photographic mark recapture analysis (Year: 2012).*

Speed et al., Spot the match—wildlife photo-identification using information theory (Year: 2007).*

International Search Report and Written Opinion dated Jun. 28, 2019, in International Appln No. PCT/EP2019/060610.

Office Action dated Jan. 21, 2022 in corresponding Chinese Patent Application No. 2019800266203.

Zhao et al., "Optimization for the Experiment Mouse Marking Identification System," Chinese Journal of Comparative Medicine, vol. 18, No. 12, pp. 70-73, Dec. 2008.

* cited by examiner

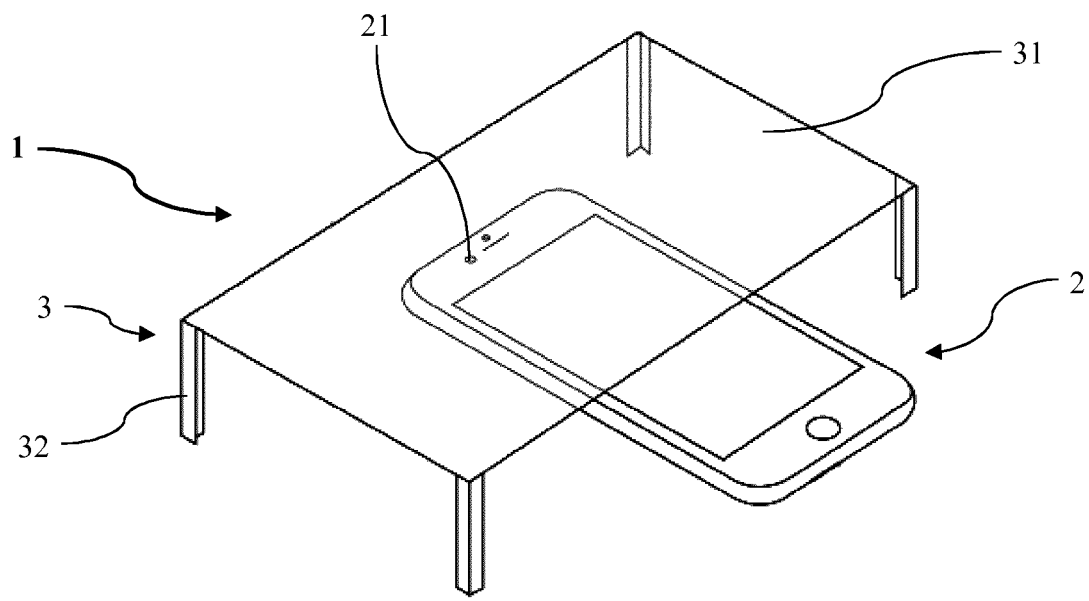
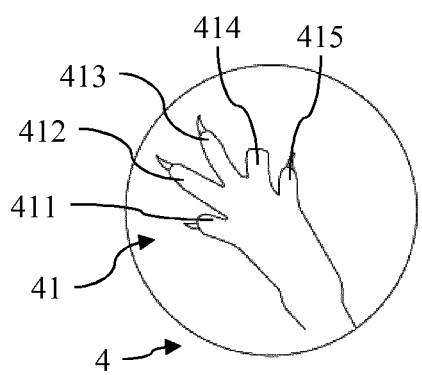
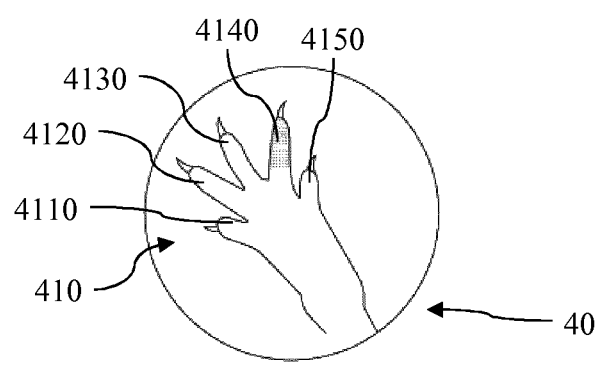
Fig. 1
Fig. 2
Fig. 3

METHOD OF AND SYSTEM FOR TRACKING AN ANIMAL IN A POPULATION OF ANIMALS

TECHNICAL FIELD

The present invention relates to a method of tracking an animal in a population of animals as well as to a system for tracking an animal in a population of animals. Such methods and systems can be particularly useful when being involved in studies such as in animal studies. For example, such animal studies are frequently used in development of pharmaceutical, cosmetic or similar products, or in transgenic breeding.

BACKGROUND ART

Many studies in research and development or breeding of animals involve populations of animals. Thereby, it typically is desired to track single and/or groups of animals within the population for collecting data about those animals as well as for performing and registering activities. Such data and activities can be crucial for evaluation within the study, e.g., for finding out how a particular substance or environmental condition affects the population and/or the individual animals.

For example, in pharmaceutical research and development, rodents such as mice or rats are often used in animal studies. For identification of the animals it is common to clip a particular combination of the toes of the animal. Thereby, a specific combination of clipped and unclipped toes can be unique for a single animal in a population. For identifying the animal, it is lifted such that the toes are visible, the toe combination is gathered and the toe combination is associated to the animal. Such identification of animals requires that the animals are physically picked which may cause undesired effort and costs. Also, the lifting or picking of the animals for identification may cause stress to the animals or population.

As an alternative it is known to tattoo or otherwise provide a unique mark onto each single animal. For example, in some studies a number is tattooed to the tails of mice forming the population of the study. However, also such identification typically requires the single mouse to be picked or otherwise isolated such that the number can be read off the tail. This may have similar disadvantages as described above in connection with the toe combination based identification.

For allowing a more automated tracking of the animals of a population it is also known to attach or implant a radio frequency identification (RFID) responder to each animal of the population. Even though such RFID responder allows for automatically identifying the single animals it is comparably costly and typically involves an invasive step. Also the effort for maintaining such identification systems usually is comparably high.

Therefore, there is a need for a method or system allowing an efficient and reliable identification of animals in a population which advantageously can be applied at semi or fully automatically.

DISCLOSURE OF THE INVENTION

According to the invention this need is settled by a method of tracking an animal in a population of animals as it is defined by the features of independent claim 1, and by a system for tracking an animal in a population of animals as it is defined by the features of independent claim 18. Preferred embodiments are subject of the dependent claims.

In one aspect, the invention is a method of tracking an animal in a population of animals, which comprises the following steps (i) applying a visual identifier to the animal; (ii) associating reference identifier data of the visual identifier to animal data of the animal; (iii) capturing a digital image of the visual identifier applied to the animal; (iv) recognizing the visual identifier by digitally processing the captured digital image; and (v) identifying the animal upon recognition of the visual identifier.

The steps of the method according to the invention can be performed in the sequence (i) to (v) as listed above or in any other suitable sequence or order.

The population of animals preferably is involved in an animal study. Such animal study can particularly be a medical animal study. For example, such animal studies can be used in pharmaceutical research and development particularly in the pre-clinical phase of medicament development.

The term "visual" in connection with the identifier can relate to any optically detectable means, condition or feature. The term covers visual in the more literal sense, i.e., being recognizable by the eye of a human being, as well as optically recognizable in more general terms, i.e. detectable by any suitable equipment such as a camera or the like. In particular, visual identifiers can also be non-detectable by the human eye but by suitable cameras, only. For example, the visual identifiers can be fluorescent or radioactive markers or the like. However, preferably the identifiers are visual in the sense that they can be detected by the eye of a human being or by a standard visual light camera.

The term "apply" in connection with the visual identifier can comprise any suitable measure for equipping the animal with the visual identifier. As described in more detail below applying can, e.g., involve tattooing and/or physically forming, such as clipping specific combinations of toes or portions thereof, the identifier on the animal.

The animal data may comprise any useful information about the animal like, e.g., its gender, its age, the treatment or medicament applied and the like.

The step of identifying the animal can be automatically executed by a computer running a dedicated software. Also, the step of automatically processing the captured digital image can comprise a computer applying image processing algorithms on digital data representing the digital image. In particular, image recognition techniques and respective algorithms can be applied.

The term "digitally processing" as used herein can relate to an automated evaluation performed by a computing device such as a desktop computer, a laptop computer, a tablet, a smartphone or the like executing an appropriate software application. In particular, digitally processing can involve image processing and particularly a combination of known image processing techniques useful for achieving the desired identification of the animal by recognizing the visual identifier.

The reference identifier data can comprise a number, a coding representing a physical structure such as a combination of clipped toes or the like, a quick response (QR) code, a barcode, or a similar identifier (ID).

By providing each animal of the population with a unique visually detectable identifier and reading off the identifier using image capturing and processing, the method according to the invention allows for an at least partially automated identification and tracking of the single animals. This allows for continuously gathering information about the population and the behavior of its animals. Furthermore, the animals can be identified on-the-fly without requiring any potentially stressful and/or cumbersome grabbing, capturing or isolating of the animal. Still further, the method allows for a cost efficient lean implementation based on know recognition techniques. Thus, the method according to the invention allows for an efficient and reliable identification of the animals in the population in a fully automatic manner.

More specifically, the method according to the invention allows for efficiently seeing and encoding the ID. An advantage of this may be that the animal can be easily handled according to animal care guidelines and animal stress associated with identification can at the same time be reduced. This may affect the animal welfare and an outcome of a endpoint measurement, including body temperature or immune response. The method according to the invention can work with tail barcoding or any other visual encoding method as, e.g., described below.

Preferably, identifying the animal upon recognition of the visual identifier comprises comparing identifier data of the visual identifier recognized by automatically processing the captured digital image to the reference identifier data. For example, the identifier data can comprise a specific number recognized on the image of the visual identifier and the reference identifier data can comprise a respective number associated to data about the animal. Such comparison can efficiently be performed on a comparably large number of reference identifiers which allows to automatically and quickly identifying one animal of a comparably large population.

Preferably, capturing the digital image of the visual identifier applied to the animal comprises positioning the animal in a reading area and generating the image when the animal is in the reading area. Such positioning can be implemented by forming a path through or over which the animals pass, e.g., for accessing food or the like. In such embodiments, the reading area can be part of the path.

In an advantageous embodiment a platform is provided and the path extends along the platform. Like this, the animal can be seen from below which allows for an efficient encoding of the ID, in particular when identifier is applied to the limbs and/or the tail. Also, animal stress can be particularly minimized during identification of the animal.

Preferably, the visual identifier is applied to at least one limb or a tail of the animal. Since usually the limbs and tails of animals often are comparably exposed such application of the visual identifier allows for gathering or detecting the identifier in a comparably efficient and reliable manner. Particularly, when using a platform, the limbs and tail are well visible such that an efficient identification can be implemented at comparably low animal stress.

Thereby, the digitally processing of the captured digital image preferably comprises detecting at least one region of interest covering the at least one limb or tail. The at least one region of interest (ROI) can be an area of the captured image having a certain number of pixels of the digital image. For example, the ROI can be sized to 100 pixels×100 pixels, to 50 pixels×50 pixels or the like. Such definition of the ROI allows for efficiently localize or narrow to the visual identifier. For example, the digital image may cover the complete or a large section of the animal whereas the identifier is applied to the limbs or tail, only. The ROI can be defined only covering the limbs and/or tail which, beyond others, allows for efficiently further processing the identification and tracking of the animal.

Thereby, digitally processing the captured digital image preferably further comprises selecting pixels of the digital image in the detected at least one ROI which have a color in a range predefined in accordance with the color of the at least one limb or tail. Since the limbs and tail usually have different colors than the rest of the animal and particularly its fur, such color recognition allows for efficiently, localizing the limbs and/or tail of the animal in an automated fashion.

Further, digitally processing the captured digital image preferably comprises classifying the at least one limb or tail in the digital image. Such classification can be based on convolutional neural network (CNN) techniques which allow for efficiently processing and precisely analyzing the digital image.

Thereby, digitally processing the captured digital image preferably comprises decoding the visual identifier from the classification of the at least one limb or tail in the digital image. Such decoding can efficiently be implemented in an automated manner, e.g., by a computing device.

Preferably, applying the visual identifier to the animal comprises clipping a combination of toes of the animal. The combination of toes can comprise a specific toe on a specific foot of the animal and/or a plurality of specific toes of one or more feet of the animal. Such combinations of toes can be visually detected in an efficient and automated manner. Also, clipping toes can be a cost efficient way of applying the identifier in a widely accepted and widespread way.

Alternatively or additionally, applying the visual identifier to the animal preferably comprises tattooing the animal. Such tattooing allows for providing a more sophisticated identifier such as a number or barcode or the like to the animal.

Thereby, a tail of the animal or a combination of toes of the animal preferably is tattooed. Particularly, when the tail or toes are not haired such tattooing can be efficient. Also, a fluorescent ink is preferably used for tattooing the animal. Such fluorescent ink allows for an efficient automated detection by an appropriate camera or the like. Seeing the limbs or, particularly, the tail and encoding the identifier have been shown to be comparably easily implementable by means of a computer such that an automated identification can efficiently be realized.

Alternatively or additionally, applying the visual identifier to the animal preferably comprises applying a fluorescent substance to the animal. For example, the fluorescent substance can be provided to a toe or a combination of toes of the animal. Like this, the animal can similarly be evaluated as described above in connection with clipping the toes but without harming the animals.

Preferably, the method comprises collecting study data about the identified animal. Such study data can be stored on an appropriate medium such as a hard disk, a flash memory, a volatile memory, a stick, a virtual data storage, e.g. in the cloud, or the like. Collecting the study data allows for providing a detailed picture about the population and each animal within a study.

Thereby, collecting the study data about the identified animal preferably comprises associating the study data to the animal data of the animal. Such association allows for gathering information about the single animals in the population.

The method according to the invention typically is not a method for treatment of a body of the animal by surgery therapy and not being a diagnostic method practiced on the human or animal body.

In another aspect, the invention is a computer program having code means adapted to configure a computing device to implement the method and/or its preferred embodiments described above when being executed by the computing device.

In still another aspect, the invention is a system for tracking an animal in a population of animals preferably involved in an animal study. The system comprises a computing arrangement configured to: (a) associate reference identifier data of a visual identifier applied to an animal to animal data of the animal; (b) recognize the visual identifier by processing a captured digital image of the visual identifier applied to the animal; and (c) identify the animal upon recognition of the visual identifier. The steps (a) to (c) can be performed in the sequence as listed or in any other suitable sequence or order.

The computing arrangement can comprise one or plural computers or computing devices such as desktop computers, laptop computers, tablets, server computers, smartphones or the like. It can also involve services accessed in a distributed environment such as so-called cloud services. If plural devices are involved, they can be wiredly and/or wirelessly connected. In one embodiment, the plural devices of the computing arrangement are connected via the Internet.

The system according to the invention allows for efficiently implementing the method according to the invention and its preferred embodiments. In particular, by the system according to the invention and its preferred embodiments described below, the same effects and benefits described above in connection with the method according to the invention and its preferred embodiments can efficiently be achieved.

Preferably, the system comprises a camera to capture the digital image of the visual identifier applied to the animal. Such camera can be a visual light camera, a fluorescent light camera or any other camera suiting the visual identifier applied to the animal. It can also be connected to the computing arrangement such that data can be exchanged between camera and computing arrangement. Also, it can be comprised by the computing arrangement. Like this, an efficient automatic identification or tracking of the animal is possible.

Preferably, the system comprises a platform defining a reading area in which the animal is to position for capturing the digital image of the visual identifier applied to the animal. Such platform allows for efficiently capturing the image in an appropriate quality.

Thereby, the platform preferably comprises a transparent essentially flat plate on which the animal is positionable. The plate or a portion thereof can form the reading area. The platform and particularly its transparent flat plate can be made of acrylic glass or the like. The camera preferably is positioned below the transparent flat plate for capturing the digital image of the visual identifier applied to the animal. Such an arrangement allows for efficiently capturing the image wherein the flat plate allows for minimizing distortions on the image and, therefore, providing a high quality and accuracy.

Preferably, the computing arrangement comprises a mobile computing device to capture the digital image of the visual identifier applied to the animal. Such mobile computing device can be a tablet computer, a smartphone, a dedicated mobile device or the like. Particularly, since smartphones nowadays typically are equipped with all necessary components for providing the captured image and since they can be sophisticatedly be programmed in accordance with the desired needs, using such a smartphone or a similar device can be comparably efficient.

Preferably, the system comprises a central computing unit configured to associate the reference identifier data to the animal data, to recognize the visual identifier, and to identify the animal. The central computing unit can be or comprise a single computer or computing device, a distributed computing system or the like. It can also be or be comprised by the computing arrangement of the system. Such central computing unit allows for efficiently evaluating the gathered data and to provide information for the study.

Preferably, the computing arrangement comprises a data storage configured to store the animal data, the reference identifier data and the digital image. Such data storage can be embodied as a hard disk, a flash memory, a memory chip, a virtual data storage (cloud), a portable memory or any other suitable data storage. It allows for gathering data over a period of time and to evaluate information about the population and/or the single animals over time.

Preferably, the computing arrangement is configured to identify a combination of clipped toes of the animal as visual identifier when processing the captured digital image of the visual identifier in order to recognize the visual identifier applied to the animal.

Preferably, the computing arrangement is configured to identify a fluorescent substance applied to the animal as visual identifier when processing the captured digital image of the visual identifier in order to recognize the visual identifier applied to the animal.

Preferably, the computing arrangement is configured to digitally process the captured digital image by detecting at least one region of interest covering at least one limb or tail.

BRIEF DESCRIPTION OF THE DRAWINGS

The method according to the invention and the system according to the invention are described in more detail below by way of exemplary embodiments and with reference to the attached drawings, in which:

FIG. 1 shows a first embodiment of a system for tracking an animal in a population of animals according to the invention;

FIG. 2 shows an application of a visual identifier to an animal within a first embodiment of a method of tracking an animal in a population of animals according to the invention;

FIG. 3 shows an application of a visual identifier to an animal within a second embodiment of a method of tracking an animal in a population of animals according to the invention.

DESCRIPTION OF EMBODIMENTS

Figure 4:
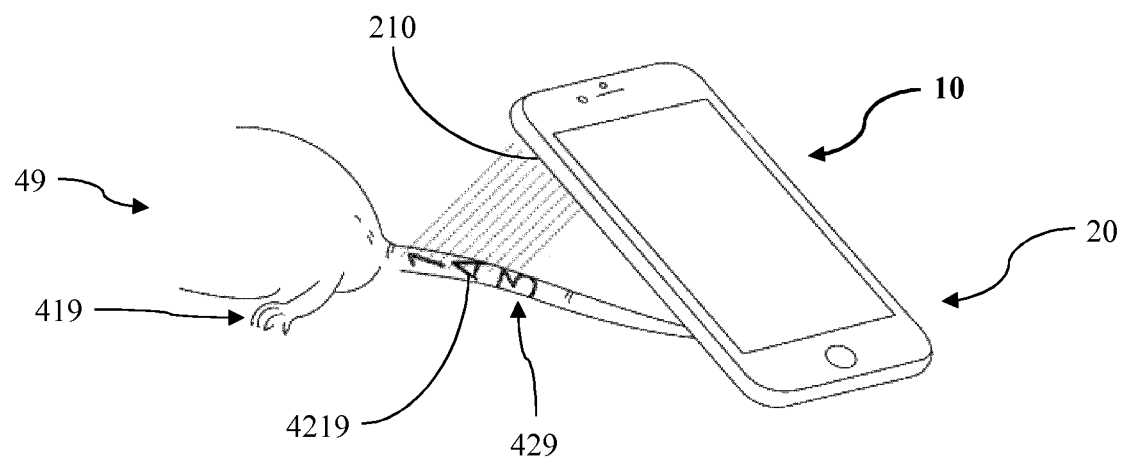
FIG. 4 shows a second embodiment of a system for tracking an animal in a population of animals according to the invention implementing a third embodiment of a method of tracking an animal in a population of animals according to the invention.

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

FIG. 1 shows a first embodiment of a system 1 according to the invention. The system 1 is adapted for tracking a mouse as animal in a population of mice as animals. It comprises a platform 3 and a computing arrangement with a smartphone 2 as mobile computing device. The platform 3 has four feet 32 carrying a transparent flat plate 31 made of acrylic glass. The plate 31 is horizontally aligned and arranged to carry a mouse as animal of the population of animals. The smartphone 2 is equipped with a front camera 21.

In FIG. 2 a front left foot of a mouse 4 of a population used in an animal study is shown. The foot of the animal 4 has toes 41 which can be numbered as a first toe 411, a second toe 412, a third toe 413, a fourth toe 414 and a fifth toe 415. The fourth toe 414 is clipped. The combination of clipped and unclipped toes 41 of all four feet of the mouse 4 serve as visual identifier within a first embodiment of a method of tracking the mice of the population according to the invention.

FIG. 3 shows a front left foot of a mouse 40 of a population used in another animal study. Toes 410 of the foot of the animal 40 have a first toe 4110, a second toe 4120, a third toe 4130, a fourth toe 4140 and a fifth toe 4150. The fourth toe 414 is tattooed. The combination of tattooed and untattooed toes 410 of all four feet of the mouse 40 serve as an alternative visual identifier within a second embodiment of a method of tracking the mice of the population according to the invention.

The first and second embodiments of the method according to invention mentioned in connection with FIG. 2 and FIG. 3 above can both be implemented by the system 1 according to the invention shown in FIG. 1. For that purpose, the smartphone 2 runs a dedicated software such that the smartphone 2 is configured to associate reference identifier data of the combinations of clipped or tattooed toes 41, 410 of each mouse 4, 40 of the respective population to a specific mouse.

The smartphone 2 is then arranged below the platform 3 such that the transparent plate 31 is in focus of the front camera 21 of the smartphone 2 and thereby forms a reading area of the platform 3. Like this, the camera 21 provides digital images of the mice 4, 40 when being located on the plate 31. In particular, the camera 21 captures a digital image of the mouse 4, 40 from below through the transparent plate 31 such that the feet of the mouse and specifically its toes 41, 410 are visible. For achieving the mice to move on the plate 31 it can, e.g., be located such that the mice 4, 40 are motivated to pass the plate 31. For example, the plate 31 can form a pathway which has to be traversed by the mice 4, 40 to access food.

The dedicated software configures the smartphone 2 such that it recognizes the combination of clipped or tattooed toes by processing the captured digital image of the mouse 4, 40. Furthermore, the dedicated software configures the smartphone 2 such that it identifies the specific mouse 4, 40 upon recognition of the combination of clipped or tattooed toes 41, 410.

The dedicated software further configures the smartphone 2 such that its central computing unit associates reference identifier data to mouse data and identifies the mouse by comparing the combination of clipped or tattooed toes 41, 410 to the reference identifier data. The smartphone 2 further comprises a data storage for storing the mouse data, the reference identifier data and the captured digital images.

FIG. 4 shows a second embodiment of a system 10 for tracking a mouse in a population according to the invention. The system 10 comprises a computing arrangement with a smartphone 20 as mobile computing device. The smartphone 20 is equipped with a back camera 210 and runs a dedicated software for configuring the smartphone 20 in accordance with the invention.

A mouse 49 of a population used in still another animal study has a tail 429. On the tail 429 an ID-string 4219 unique for the specific mouse 49 is tattooed as a visual identifier within a third embodiment of a method of tracking the mice of the population according to the invention. The dedicated software configures the smartphone 20 to associate reference identifier data of the ID-string 4219 of each mouse 49 of the population to a single specific mouse 49.

The smartphone 20 is then positioned behind the mouse 49 such that the tail 429 is in focus of the back camera 210. Like this, the camera 210 provides digital images of the mice 49 on which the respective ID-strings 4219 are visible. The dedicated software configures the smartphone 20 such that it recognizes the ID-Strings 4219 by processing the captured digital image of the mouse 49. Furthermore, the dedicated software configures the smartphone 20 such that it identifies the specific mouse 49 upon recognition of the ID-String 4219.

Each of the methods according to the invention described hereinbefore involves similar steps by using the respective system 1, 10 and, more specifically, by the dedicated software configuring the smartphone 2, 20 appropriately. In particular, it comprises the steps of: applying a unique combination of clipped toes 41, a unique combination of tattooed toes 410 or a unique ID-string 4219 as visual identifier to each of the mice 4, 40, 49. It further comprises associating reference identifier data of the visual identifier 41, 410, 4219 to mouse data of each mouse 4, 40, 49; capturing digital images of the visual identifiers 41, 410, 4219; recognizing single visual identifier 41, 410, 4219 by digitally processing the captured digital image; and identifying the specific mouse 4, 40, 49 upon recognition of the visual identifier 41, 410, 4219.

For identifying the specific mouse 4, 40, 49 upon recognition of the visual identifier 41, 410, 4219 identifier data of the visual identifier 41, 410, 4219 recognized by automatically processing the captured digital image is compared to the reference identifier data. The captured digital images are processed by detecting at least one region of interest (ROI) covering the feet or tail 429 of the specific mouse 4, 40, 49.

Thereby, the dedicated software configures the smartphone 2, 20 to select pixels of the digital image in the detected at least one region of interest which have a color in a range predefined in accordance with the color of the feet or tail of the mice 4, 40, 49 and to classify the feet or tail in the digital image by applying convolutional neural network (CNN) techniques and by decoding the visual identifier from the classification of the feet or tail in the digital image.

This description and the accompanying drawings that illustrate aspects and embodiments of the present invention should not be taken as limiting—the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the FIGS. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

A computer program may be stored/distributed on a suitable medium, such as an optical storage medium or a solid-state medium supplied together with or as part of other hardware, but may also be distributed in other forms, such as via the Internet or other wired or wireless telecommunication systems. In particular, e.g., a computer program can be a computer program product stored on a computer readable medium which computer program product can have computer executable program code adapted to be executed to implement a specific method such as the method according to the invention. Furthermore, a computer program can also be a data structure product or a signal for embodying a specific method such as the method according to the invention.

The invention claimed is:

1. A method of tracking an animal in a population of animals, comprising:
    applying a visual identifier to the animal comprising clipping a combination of toes of at least one limb of the animal;
    associating reference identifier data of the visual identifier to animal data of the animal;
    providing a platform having a transparent essentially flat plate defining a reading area and positioning a camera below the transparent essentially flat plate,
    capturing, by the camera, a digital image of the visual identifier including the combination of clipped toes of the at least one limb of the animal
    in the reading area and generating the digital image when the animal is in the reading area;
    recognizing the combination of clipped toes of the at least one limb of the animal from the digital image by digitally processing the captured digital image, wherein digitally processing the captured digital image comprises detecting at least one region of interest covering the at least one limb and selecting pixels of the digital image in the detected at least one region of interest which have a color in a range predefined in accordance with the color of the at least one limb to localize the combination of clipped toes of the visual identifier from the digital image;
    comparing the recognized combination of clipped toes of the at least one limb of the animal to the reference identifier data of the visual identifier; and
    identifying the animal based upon a result of the comparing the recognized combination of clipped toes to the reference identifier data of the visual identifier.

2. The method of claim 1, wherein the digitally processing the captured digital image comprises classifying the at least one limb in the digital image and wherein the digitally processing the captured digital image preferably comprises decoding the visual identifier from the classification of the at least one limb in the digital image.

3. The method of claim 1, comprising collecting study data about the identified animal, wherein the collecting the study data about the identified animal preferably comprises associating the study data to the animal data of the animal.

4. The method of claim 1, wherein the population of animals is involved in an animal study.

5. The method of claim 1, wherein the recognizing the combination of clipped toes of the at least one limb of the animal further includes:
    applying a convolutional neural network to generate a classification of the at least one limb in the digital image, and
    decoding the visual identifier from the classification.

6. The method of claim 1, wherein the digitally processing the digital image further includes localizing the at least one limb according to the pixels having the color of the at least one limb being different than a second color of the animal.

7. A system for tracking an animal in a population of animals preferably involved in an animal study, comprising:
    a computing arrangement to:

associate reference identifier data of a visual identifier applied to an animal to animal data of the animal, the visual identifier being applied to the animal comprising a combination of toes of at least one limb of the animal;

recognize from a digital image of the visual identifier including the combination of clipped toes of the at least one limb of the animal by digitally processing the digital image of the visual identifier applied to the animal, wherein the digitally processing the digital image comprises detecting at least one region of interest covering the at least one limb and selecting pixels of the digital image in the detected at least one region of interest which have a color in a range predefined in accordance with the color of the at least one limb to localize the combination of clipped toes of the visual identifier from the digital image, and wherein the system comprises a platform having a transparent essentially flat plate defining a reading area in which the animal is to be positioned for capturing the digital image of the visual identifier applied to the animal via a camera, the camera being positionable below the transparent essentially flat plate for capturing the digital image of the combination of clipped toes of the at least one limb of the animal;

compare the recognized combination of the clipped toes of the at least one limb of the animal to the reference identifier data of the visual identifier; and identify the animal based upon a result of comparing the recognized combination of the clipped toes to the reference identifier data of the visual identifier.

8. The system of claim 7, wherein the computing arrangement comprises:
- a mobile computing device comprising the camera to capture the digital image of the combination of clipped toes of at least one limb of the animal applied to the animal, and
- a data storage to store the animal data, the reference identifier data and the digital image.

9. The system of claim 7, further comprising a central computing unit to associate the reference identifier data to the animal data, to recognize the combination of clipped toes of at least one limb of the animal, and to identify the animal.

10. The system of claim 7, wherein the at least one limb in the digital image is recognized by:
- applying a convolutional neural network to generate a classification of the at least one limb in the digital image, and
- decoding the visual identifier from the classification of the at least one limb in the digital image.

11. The system of claim 7, wherein the computing arrangement further digitally processes the digital image by:
- selecting pixels of the digital image in the detected at least one region of interest which have the color in the range predefined in accordance with the color of the at least one limb, and
- localizing the at least one limb according to the pixels having the color of the at least one limb being different than a second color of the animal.

\* \* \* \* \*